United States Patent [19]

Bitzan

[11] 3,814,445
[45] June 4, 1974

[54] SEAL ASSEMBLY
[75] Inventor: James A. Bitzan, St. Cloud, Minn.
[73] Assignee: DeZurik Corporation, Sartell, Minn.
[22] Filed: Feb. 10, 1972
[21] Appl. No.: 225,120

[52] U.S. Cl. ............................................. 277/165
[51] Int. Cl. ........................ F16j 15/34, F16j 15/40
[58] Field of Search ............ 277/138, 165, 168–172, 277/71; 92/188, 212

[56] References Cited
UNITED STATES PATENTS

| 3,149,849 | 9/1964 | Baldridge | 277/165 |
| 3,268,235 | 8/1966 | Jacobellis | 277/165 |
| 3,663,024 | 5/1972 | Traub | 277/165 |
| 3,678,809 | 7/1972 | Doutt | 277/71 |

FOREIGN PATENTS OR APPLICATIONS

| 756,460 | 9/1956 | Great Britain | 277/165 |
| 1,901,274 | 7/1970 | Germany | 277/165 |

Primary Examiner—Louis R. Prince
Assistant Examiner—Robert I. Smith
Attorney, Agent, or Firm—Jeffrey S. Mednick

[57] ABSTRACT

An improved seal assembly includes a "Teflon" seal ring of rectangular cross-section and a resilient O-ring disposed in a stepped circumferential recess in the piston of a linear actuator. Two axially spaced grooves in the outer surface of the seal ring opposite the sidewalls of the inner portion of the stepped recess concentrate the sealing force of the compressed O-ring on the central portion of the seal ring. The edges of the seal ring outboard of the grooves are positively backed-up by shoulders in the stepped recess to prevent twisting and roll out of the seal assembly. The seal ring is loosely fit into the outer portion of the stepped recess to reduce friction on the leading and trailing edges and to admit entrance of the fluid medium from the high pressure side of the piston into the step recess to increase the sealing force exerted by both the seal ring and the O-ring.

6 Claims, 3 Drawing Figures

PATENTED JUN 4 1974

3,814,445

SEAL ASSEMBLY

BACKGROUND OF THE INVENTION

The present invention relates generally to seal constructions and more particularly concerns an improved seal assembly for linear fluid actuators.

In linear fluid actuators, a piston is slidably fitted in a cylinder with a small clearance space which is normally sealed by a circumferential seal element carried in a groove in the piston. In the past, these seal elements have been made of a wide variety of materials including, for example, leather, rubber and metal depending on the particular application. More recently, various plastic materials have been employed for seal rings because of their relatively low cost and low friction characteristics. In particular, a number of fluorinated hydrocarbon polymers, for example, "Teflon" sold by DuPont, have been developed which are not only inert to a large number of process fluids but which also are able to withstand higher temperature and pressure conditions then most other synthetic materials.

However, while these fluorinated hydrocarbon polymers have a very low coefficient of friction and are generally regarded as resilient, they tend to "cold-flow", i.e., take on a permanent set or change in shape or dimension when subjected to prolonged stresses such as may be encountered in sealing the clearance space between a piston and cylinder. In order to overcome this tendency of "Teflon" to cold-flow, primary sealing rings made of this material are frequently backed-up by an O-ring or the like made of a more resilient material such as synthetic rubber. Several examples of this sort may be seen in U.S. Pat. Nos. 3,268,235 and 3,328,041 and in reissue U.S. Pat. No. Re. 24,440.

As is typical in such seal assemblies and as will be noted in the three above-mentioned patents, both the primary "Teflon" seal ring and the resilient O-ring are disposed in a common groove. Therefore, although the slightly compressed O-ring exerts a radial force on the central portion of the "Teflon" seal ring, both the leading and trailing edges of the seal ring are left unsupported with the result that the seal ring may twist or actually roll out of the groove. While separate guide rings adjacent the leading and trailing edges of the seal ring have been employed to reduce this tendency of the seal ring to twist and roll out, they are not entirely effective and they also increase the cost of the seal assembly as well as that of the piston and cylinder both of which must be longer for a given working stroke to accommodate the guide rings on either side of the seal ring.

Several other forms of "Teflon" and O-ring seal assemblies are shown in U.S. Pat. Nos. 2,825,590 and 2,895,772 and a split metallic piston ring backed-up by an O-ring or other resilient element is shown in U.S. Pat. No. 2,745,660. However, none of these patents disclose a seal assembly of the present type wherein a pair of axially spaced grooves are provided in the outer surface of the "Teflon" seal ring substantially opposite the sidewalls of the inner portion of a stepped recess to concentrate the sealing force of the compressed O-ring on the central portion of the seal ring while reducing wear on the leading and trailing edges of the seal ring which are positively backed-up by the shoulders in the stepped recess to prevent roll-out of the seal assembly.

These and other objects and advantages of the invention will become more readily apparent upon reading the following detailed description and upon reference to the accompanying drawings.

DESCRIPTION OF THE PREFERRED EMBODIMENT

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
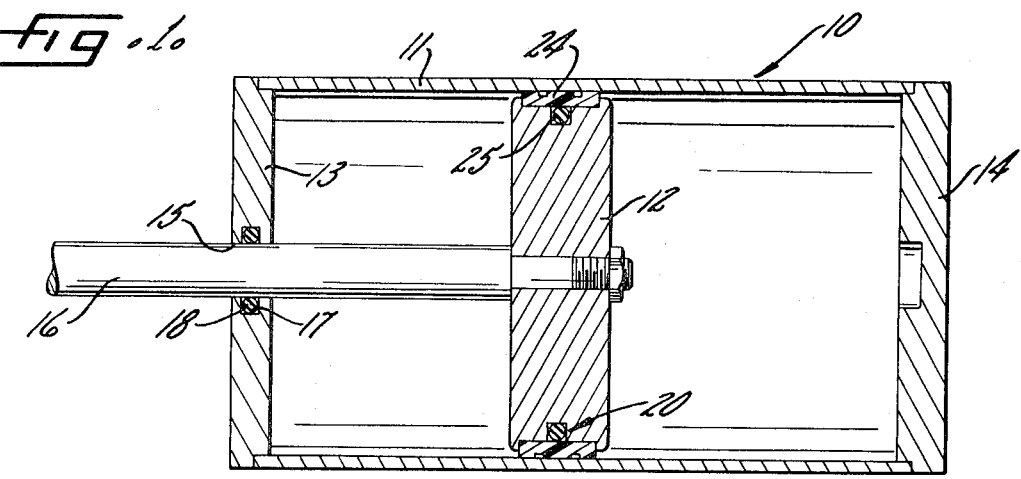
FIG. 1 is a longitudinal cross section of a linear fluid actuator employing the improved seal assembly of the present invention.

Turning now to the drawings, there is shown in FIG. 1 a linear fluid actuator 10 including a cylinder 11 and a piston 12. The ends of the cylinder are closed by suitable end caps 13 and 14, each of which may include a port (not shown) for the admission and discharge of the operative fluid medium. In this illustrative embodiment, the left-hand end cap 13 is also provided with a central aperture 15 which slidably receives a piston rod 16 suitably connected to the piston 12. The aperture 15 is preferably provided with a circumferential groove 17 in which an O-ring seal 18 or other suitable packing is retained to provide a seal between the piston rod 16 and the end cap 13.

In accordance with the present invention, an improved seal assembly 20 is provided to seal the clearance space 21 between the piston 12 and the inner wall of the cylinder 11. As shown in the drawings, the piston 12 is provided with a circumferential recess having a relatively wide and shallow generally rectangular outer portion 22 and a generally square and centrally located inner portion 23. The seal assembly 20 includes a circumferential sealing ring 24 disposed in the outer recess portion 22 and a resilient O-ring 25 disposed in the inner recess portion 23.

Figure 2:
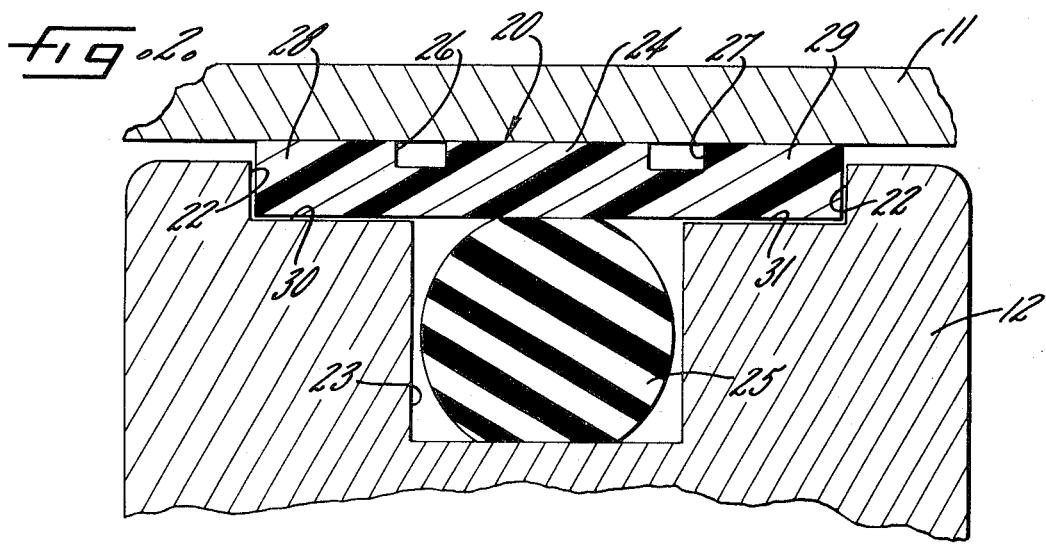
FIGS. 2 and 3 are enlarged fragmentary cross sections of the improved seal assembly shown in FIG. 1.

As shown in FIG. 2, the sealing ring 24, in axial cross-section, is generally rectangular and has a width slightly less than that of the outer recess portion 22 and has a radial thickness greater than the depth of the outer recess portion 22. The O-ring 25, in axial cross-section, has a diameter less than the width of the inner recess portion 23 but greater than the depth of the recess portion 23. As a result, the O-ring 25 is compressed radially in the inner recess portion 23 by the sealing ring 24. This assures that a tight fluid seal is provided between the O-ring 25 and the base of the inner recess portion 23 and also between the O-ring and the inner surface of the sealing ring 24. At the same time, the compressed O-ring 25 exerts a radially outwardly directed force on the sealing ring 24 to urge the outer surface of the sealing ring into sealing engagement with the inner surface of the cylinder 11.

Pursuant to the present invention, the radial force exerted on the sealing ring 24 by the compressed O-ring is concentrated on the surface of the sealing ring 24 generally opposite the inner recess portion 23. To this end, a pair of axially spaced circumferential grooves 26 and 27 are formed in the outer surface of the sealing ring 24 substantially opposite the respective side walls of the inner recess portion 23. Each of the grooves 26, 27 defines a predetermined flexure point in the axial cross-section of the sealing ring 24 whereby maximum sealing pressure against the inner wall of the cylinder 11 is afforded by the outer surface of the sealing ring between the grooves 26, 27.

In keeping with another important aspect of the present invention, the seal assembly 20 including the seal ring 24 and O-ring 25 is effectively prevented from rolling or blowing out of the recess formed in the piston even during operation at high pressures and rapid cyclical reversals. This is accomplished by providing the marginal edges 28 and 29 of the sealing ring 24 outboard of the grooves 26, 27 with positive radial back-ups in the form of shoulders 30 and 31 respectively, which form the axially separated base sections of the outer recess portion 22. These shoulders 30, 31 prevent any substantial twisting of the seal ring 24 by positively limiting the radially inward movement of the marginal edges 28, 29.

It is a further feature of the present invention, that the marginal edges 28 and 29 of the seal ring 24 obviate the need for separate guide rings on either side of the seal ring. Accordingly, the axial length of both the piston 12 and the cylinder 11 may be reduced without decreasing the working stroke of the piston. This, of course, results in a reduction of materials and manufacturing costs for these components.

Figure 3:
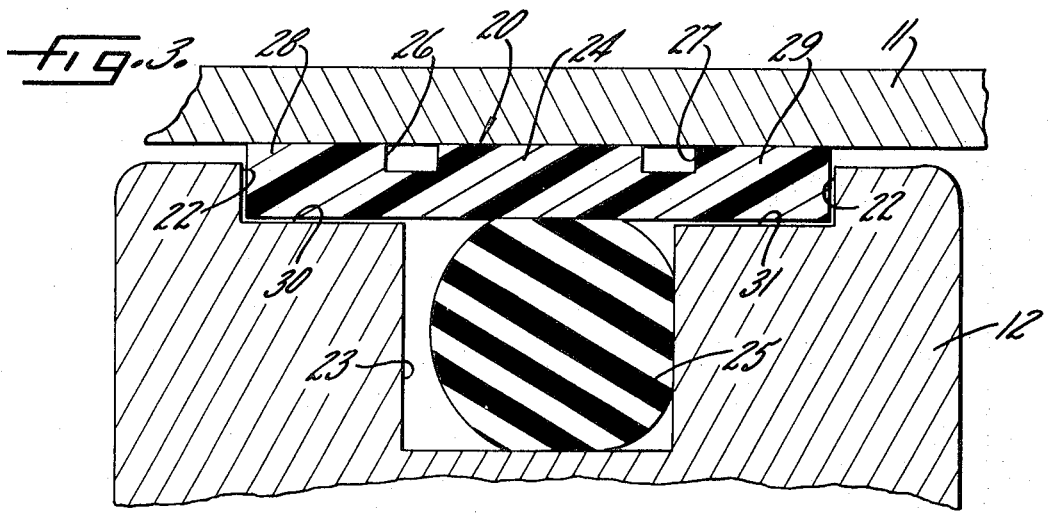

Pursuant to yet another aspect of the present invention, the effectiveness of the seal provided by the seal assembly 20 increases with increases in the pressure of the fluid medium against which the piston 12 operates. In this regard, the seal ring 24 is dimensioned to fit loosely in the outer recess portion 22 so that the working fluid medium from the high pressure side of the piston 12 may enter into the outer recess portion 22 and into the inner recess portion on the high pressure side of the O-ring. Thus, the pressure of the fluid medium exerts a force radially outwardly against the seal ring 24 increasing the effectiveness of its seal with the inner surface of the cylinder 11. At the same time, the pressure of the fluid medium in the inner recess portion 23 increases the compressive force exerted against the O-ring 25 causing it to flatten somewhat against the opposite wall of the inner recess portion 23 as seen in somewhat exaggerated fashion in FIG. 3.

The loose fit of the seal ring 24 in the outer groove portion 22 is also instrumental in reducing the friction between the outboard ends 28, 29 of the seal ring and the inner wall of the cylinder 11. This permits the ends 28, 29 to perform their function as alternately leading and trailing edges of the seal ring without encountering excessive wear. It will also be appreciated that the entire seal assembly 20 tends to be self-compensating for wear due to the compressive force exerted by the O-ring 25 and the controlled flexure of the seal ring 24 provided by the grooves 26, 27.

In the preferred embodiment, the seal ring 24 is formed of a fluorinated hydrocarbon polymer principally comprised of polymerized tetrafluoroethylene such as "Teflont" sold by DuPont. This material is well known for its low friction characteristics, is thermally stable at temperatures up to 500° F. and is substantially unaffected by a wide range of chemicals and process fluids. Accordingly, the fluid medium used with the actuator 10 may be air, steam, water or any of various hydraulic fluids.

It will also be appreciated that the location, dimensioning and cooperation of the grooves 26, 27 with respect to the dimensions of the seal ring 24, the O-ring 25 and the outer and inner recess portions 22, 23, are important in providing proper flexure to achieve good sealing and long lasting wear characteristics for the seal assembly 10. As shown in the drawings the grooves 26, 27 divide the outer surface of the seal ring 24 into three circumferential sealing bands of substantially the same width (measured axially) although, in the preferred embodiment, the central one of these sealing bands is slightly wider than the other two. The depth of the grooves 26, 27 should be less than one-half of the radial thickness of the sealing ring 24 and about one-half of the width of the grooves. Good flexure characteristics are obtained when the depth of the grooves 26, 27 is between about one-fifth and one-third of the radial thickness of the sealing ring and preferably the depth of the grooves is about one-fourth of the thickness of the sealing ring.

From the foregoing, it will be appreciated that the improved seal assembly 10 of the present invention provides a highly effective and long lasting seal for linear actuator pistons. The flexure grooves 26, 27 in the seal ring 24 cooperate with the O-ring 25 to concentrate maximum sealing force between the inner cylinder wall and the sealing ring 24 opposite the inner recess portion 23 of the piston. The shoulders 30, 31 provide positive back-up for the outboard edges 28, 29 of the seal ring to prevent the seal ring from twisting or rolling out of the recess without requiring the use of separate guide rings. The loose fit of the seal ring in the outer recess portion not only reduces wear on the outboard edges 28, 29 of the seal ring, but also permits the fluid medium from the high pressure side of the piston to enter the recess portion and increase the seal pressure exerted by both the seal ring 24 and the O-ring 25 against one another and against the cylinder wall and side wall of the inner recess portion 23, respectively.

I claim as my invention:

1. A seal assembly for sealing the space between an internal wall of a cylinder and a piston reciprocally mounted therein, comprising:

an annular recess in one of said cylinder and piston, said recess having a first portion of given axial width and a second portion of greater axial width, said second portion of said annular recess being closer to the other of said cylinder and piston than said first portion of said annular recess, the axial ends of said first portion being spaced axially from the axial ends of said second portion to form shoulders in said recess;

a sealing ring in said second portion of said annular recess, said sealing ring having an axial width that is less than that of said second portion of said annular recess and greater than that of said first portion of said annular recess;

said sealing ring having a first axially extending surface facing said other of said cylinder and piston and a second surface axially extending from one end of said sealing ring to another end of said sealing ring and facing said shoulder, said second surface being spaced from said shoulder to permit fluid to be sealed to pass between said shoulder and said sealing ring;

a pair of annular grooves axially spaced in the first surface of said sealing ring to divide said sealing ring into a central band and sidebands, at least a portion of each of said grooves axially overlapping one of said shoulders;

and a resilient ring radially compressed between an axially extending wall of said first portion and said central band of said sealing ring, whereby said resilient ring and said fluid cooperate to force said central band of said sealing ring into fluid tight engagement with said other of said cylinder and piston while reducing wear of said sidebands.

2. A seal assembly as defined in claim 1, wherein said one of said cylinder and piston is said piston, and said other of said cylinder and piston is said cylinder.

3. A seal assembly as defined in claim 2, wherein said sealing ring is made of a flourinated hydrocarbon polymer principally comprised of polymerized tetraflouroethylene.

4. A seal assembly as defined in claim 3, wherein said sealing ring is generally rectangular in axial cross-section and said resilient ring is generally circular in axial cross-section.

5. A seal assembly as defined in claim 4, wherein said central band is slightly wider than said side bands, said grooves having a depth between about one-fifth and about one-third of the radial thickness of said sealing ring, and said resilient ring engaging said second surface of said sealing ring on the central band.

6. A seal assembly as defined in claim 5, wherein said resilient ring engages one side of said first portion of said annular recess.

* * * * *